(12) United States Patent
Takahashi

(10) Patent No.: US 8,560,560 B2
(45) Date of Patent: Oct. 15, 2013

(54) DEVICE AND METHOD FOR DISTRIBUTED PROCESSING

(75) Inventor: Ken Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 38 days.

(21) Appl. No.: 13/073,083

(22) Filed: Mar. 28, 2011

(65) Prior Publication Data

US 2011/0246510 A1 Oct. 6, 2011

(30) Foreign Application Priority Data

Mar. 31, 2010 (JP) .................................. 2010-83901

(51) Int. Cl.
*G06F 7/00* (2006.01)
*G06F 17/30* (2006.01)

(52) U.S. Cl.
CPC .. *G06F 7/00* (2013.01); *G06F 17/30* (2013.01)
USPC .......................................... 707/764; 707/769

(58) Field of Classification Search
None
See application file for complete search history.

(56) References Cited

U.S. PATENT DOCUMENTS

| 5,442,765 | A | 8/1995 | Shiga |
|---|---|---|---|
| 6,745,198 | B1 * | 6/2004 | Luo et al. .............................. 1/1 |
| 6,957,215 | B2 * | 10/2005 | Stark ..................................... 1/1 |
| 7,024,414 | B2 * | 4/2006 | Sah et al. .............................. 1/1 |
| 7,689,560 | B2 * | 3/2010 | Barabas et al. ......... 707/999.008 |
| 2010/0088289 | A1 * | 4/2010 | Zhu et al. ...................... 707/695 |
| 2011/0202929 | A1 * | 8/2011 | Schleimer et al. ............ 718/106 |

FOREIGN PATENT DOCUMENTS

JP 04-219844 8/1992

\* cited by examiner

*Primary Examiner* — Jay Morrison
(74) *Attorney, Agent, or Firm* — Staas & Halsey LLP

(57) ABSTRACT

A distributed processing device includes a searching unit that searches, in accordance with attribute names identifying a plurality of records stored on a database, a process group for a second process having as a process target a record of an attribute name different from an attribute name included in a process request of a first process selected from among the process group to the database, a determining unit that determines the first process and the second process as execution targets to be executed by a plurality of nodes when the second process is hit by the searching unit, and an allocation unit that allocates the execution target determined by the determining unit to the plurality of nodes that execute the processes in parallel to the database.

12 Claims, 17 Drawing Sheets

FIG. 5

| ENTITY (TABLE NAME) | ATTRIBUTES 500 | | | | | | | |
|---|---|---|---|---|---|---|---|---|
| STATISTICS OF STUDENTS | SCHOOL ID(PK) | TOTAL NUMBER | NUMBER OF FRESHMEN | NUMBER OF SOPHOMORES | NUMBER OF JUNIORS | NUMBER OF SENIORS | ... | ... |
| STATISTICS OF TEACHING PERSONNEL | SCHOOL ID(PK) | TOTAL NUMBER | NUMBER OF TEACHERS | NUMBER OF OFFICE WORKERS | NUMBER OF PART-TIMERS | NUMBER OF ADMINISTRATION OFFICERS | ... | ... |
| INCOME | SCHOOL ID(PK) | TOTAL | SCHOOL FEES | SUBSIDY | EXAMINATION FEES | LECTURE FEES | ... | ... |
| SPENDING | SCHOOL ID(PK) | TOTAL | PAYROLL | FACILITY COSTS | ADMINISTRATIVE FEES | HEAT AND LIGHT EXPENSES | ... | ... |
| ... | ... | ... | ... | ... | ... | ... | ... | ... |

FIG. 11

| EXCLUSIVE ITEM | E | D | C | B | A |
|---|---|---|---|---|---|
| 1 | 1 | 1 | 0 | 0 | 0 |
| 2 | 0 | 1 | 0 | 1 | 0 |
| 3 | 0 | 0 | 1 | 0 | 1 |
| 4 | 0 | 0 | 1 | 0 | 0 |
| 5 | 1 | 0 | 1 | 0 | 0 |
| 6 | 1 | 0 | 0 | 0 | 1 |
| 7 | 0 | 1 | 0 | 0 | 1 |
| 8 | 0 | 1 | 0 | 1 | 1 |
| ⋮ | ⋮ | ⋮ | ⋮ | ⋮ | ⋮ |

FIG. 15

| EXCLUSIVE ITEM | E | D | C | B | A |
|---|---|---|---|---|---|
| 1 | 1 | 1 | 0 | 0 | 0 |
| 2 | 0 | 1 | 0 | 1 | 0 |
| 3 | 0 | 0 | 1 | 0 | 1 |
| 4 | 0 | 0 | 1 | 0 | 0 |
| 5 | 1 | 0 | 1 | 0 | 0 |
| 6 | 1 | 0 | 0 | 0 | 1 |
| 7 | 0 | 1 | 0 | 0 | 1 |
| 8 | 0 | 1 | 0 | 1 | 1 |
| ⋮ | ⋮ | ⋮ | ⋮ | ⋮ | ⋮ |
| 20 | 1 | 1 | 0 | 1 | 1 |

~1120

DEVICE AND METHOD FOR DISTRIBUTED PROCESSING

CROSS-REFERENCE TO RELATED APPLICATIONS

This application is based upon and claims the benefit of priority of the prior Japanese Patent Application No. 2010-083901, filed on Mar. 31, 2010, the entire contents of which are incorporated herein by reference.

FIELD

Various embodiments discussed herein are related to a device and method for distributed processing.

BACKGROUND

A today's widely used system in crowd computing field permits a plurality of request sources to make a process request to a database. A system of the type receiving a process request to a common server from a plurality of clients as request sources includes a plurality of nodes performing the received process request.

However, if the system merely causes the plurality of nodes to perform the plurality of process requests, a progress status of each node is difficult to learn in response to the process request. It is likely that the process requests center on a particular node. A technique of using a forward proxy device for receiving together the process requests from a plurality of clients is available.

The forward proxy device evenly sorts the received process requests among a plurality of nodes in order to lighten workload in each node. The use of the forward proxy device helps learn which node performs a process request issued by a process request source as a client. Replication transparency and location transparency are thus guaranteed (as described in Japanese Laid-Open Patent Publication No. 04-219844).

SUMMARY

According to an aspect of an embodiment, a distributed processing device includes a searching unit that searches, in accordance with attribute names identifying a plurality of records stored on a database, a process group for a second process having as a process target a record of an attribute name different from an attribute name included in a process request of a first process selected from among the process group to the database, a determining unit that determines the first process and the second process as execution targets to be executed by a plurality of nodes when the second process is hit by the searching unit, and an allocation unit that allocates the execution target determined by the determining unit to the plurality of nodes that execute the processes in parallel to the database.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of data as a process target;
FIG. 11 illustrates an example of a transaction data item cache table;
FIG. 15 illustrates an exclusive item bit train added to the transaction data item cache table.

DESCRIPTION OF EMBODIMENTS

A forward proxy device of related art uses the number of process requests as determination criteria when received process requests are sorted to process nodes. For example, a process request is allocated with a higher priority to a process node which is in an idling state waiting for a process request or which has a smaller number of waiting process requests than another process node.

When a process request sorted to a process node is actually executed, no consideration is given to which record is accessed in a common database. For example, a process request executed by another process node may access substantially the same record in the shared database. If accessing centers on substantially the same record, the other process node is forced to remain in a lock state until the process request executed by one process node is complete. The other process node is prevented from executing the process until it is released from the lock state. The forward proxy device is subject to a performance drop caused by the waiting until the release from the lock state.

With reference to the attached drawings, a device, a method, and a program for a distributed processing process as embodiments are described below.

Figure 1:
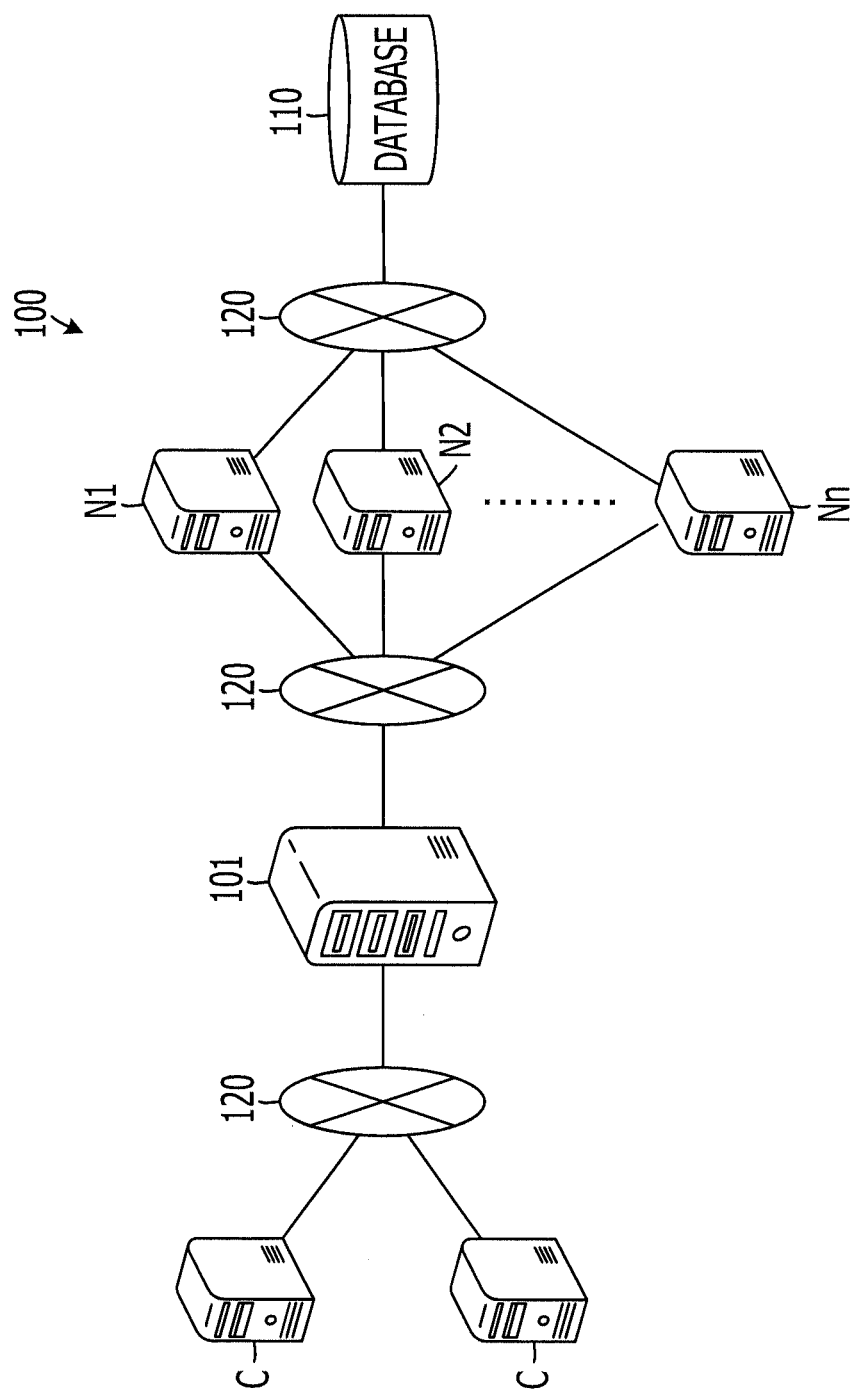
FIG. 1 illustrates an example of a network system.

FIG. 1 illustrates a network system 100 of one embodiment. Referring to FIG. 1, the network system 100 includes distributed processing device 101, client devices C, a plurality of nodes N1-Nn, and database 110. The distributed processing device 101, the nodes N1-Nn, the clients C, and the database 110 are connected to each other via wired or wireless network 120 in the network system 100.

The distributed processing device 101 allocates a process group to the database 110 to the plurality of nodes N1-Nn. The client device C transmits a process request of a process to the database 110 to the distributed processing device 101. The nodes N1-Nn are computers performing the process allocated by the distributed processing device 101. The nodes N1-Nn may perform the processes to the database 110 in parallel.

When the network system 100 causes the nodes N1-Nn to distributed-process a process group to the database 110, the distributed processing device 101 does not allocate processes having as a process target a record of substantially the same attribute name to the nodes N1-Nn at substantially the same timing. The attribute name is attribute information identifying each record in the database 110. This arrangement prevents accessing to substantially the same record at substantially the same timing in the database 110, and reduces the waiting time before the release from the lock state in exclusive control of access to substantially the same record. Performance drop in the network system 100 is thus avoided.

Hardware Configuration of the Distributed Processing Device

Figure 2:
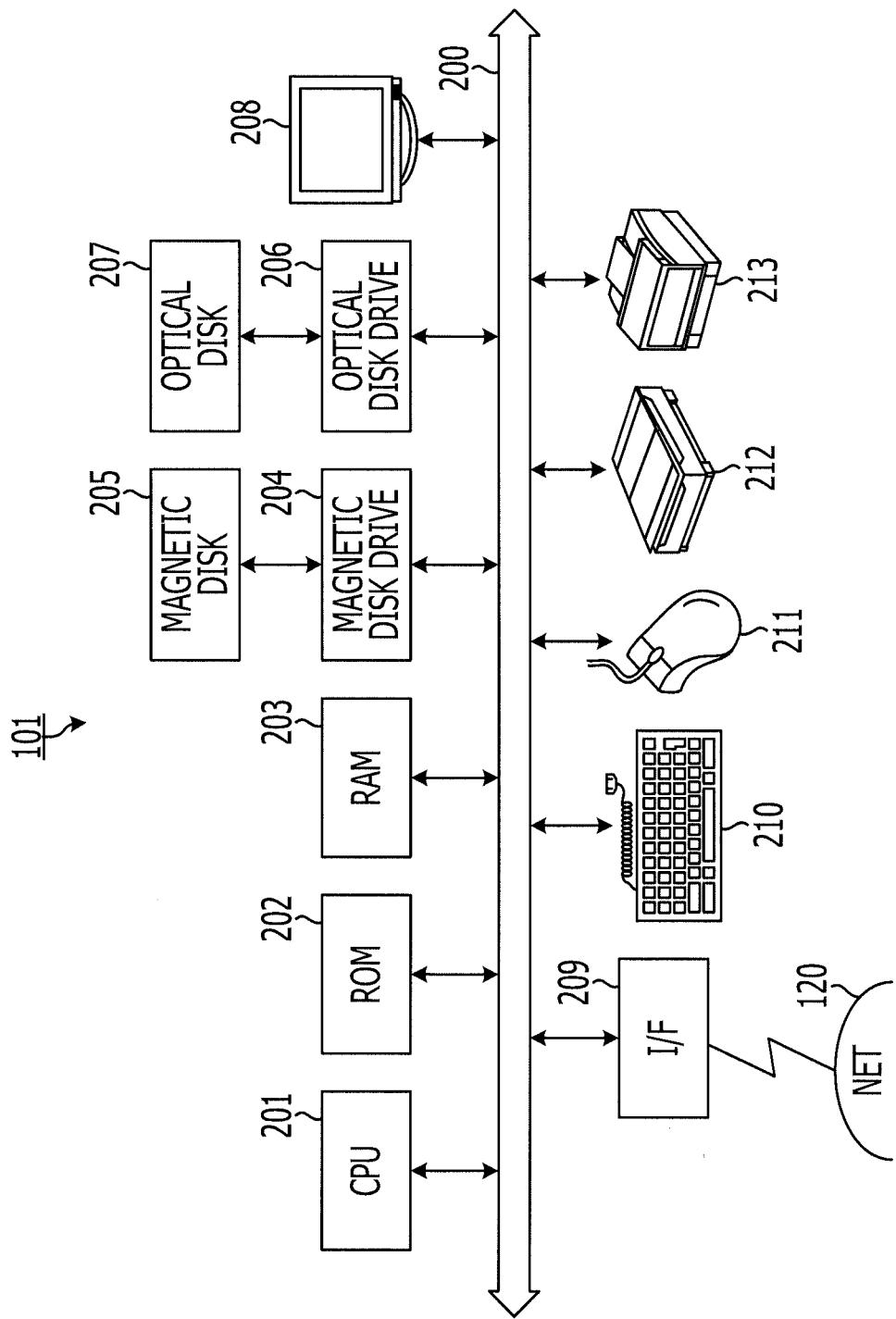
FIG. 2 illustrates an example of a hardware configuration of a distributed processing device.

FIG. 2 illustrates a hardware configuration of the distributed processing device of the embodiment. As illustrated in FIG. 2, the distributed processing device 101 includes central processing unit (CPU) 201, read-only memory (ROM) 202, random-access memory (RAM) 203, magnetic disk drive 204, magnetic disk 205, optical disk drive 206, optical disk 207, display 208, interface (I/F) 209, keyboard 210, mouse 211, scanner 212, and printer 213. Those units are connected via a bus 200.

The CPU 201 generally controls the distributed processing device 101. The ROM 202 stores a variety of computer programs such as a boot program and a distributed processing program for performing a distributed processing process. The RAM 203 is used as a work area of the CPU 201. The magnetic disk drive 204 under the control of the CPU 201 controls read/write operations on the magnetic disk 205. The magnetic disk 205 stores data written under the control of the magnetic disk drive 204.

The optical disk drive 206 under the control of the CPU 201 controls read/write operations of data to the optical disk 207. The optical disk 207 stores data written under the control of the optical disk drive 206 and causes the computer to read the stored data.

The display 208 displays a cursor, an icon, a toolbox. The display 208 also displays data such as a document, an image, and functional information. The display 208 may include a cathode-ray tube (CRT), a thin-film transistor (TFT) liquid-crystal display, or a plasma display.

The interface 209 is connected to a network 120 such as a local-area network (LAN), a wide-area network (WAN), or the Internet via a communication line. The interface 209 is connected to an external device via the network 120. The interface 209 serves as an interface between the network 120 and the internal units of the distributed processing device 101. The interface 209 controls outputting and inputting of data to and from the external device. A modem or a LAN adaptor may be used for the interface 209.

The keyboard 210 includes keys for inputting characters, numerals, and a variety of instructions, and thus inputs data. The keyboard 210 may be a touch panel input pad or touchpad numerical keys. The mouse 211 is used to move a cursor, to set a range on a screen, to move a window, or modify a size of the window. A trackball or a joystick with a function of a pointing device may be used for the mouse 211.

The scanner 212 optically reads an image, and retrieves image data into the distributed processing device 101. The scanner 212 may have a function of an optical character reader (OCR). The printer 213 prints output image data and text data. A laser printer or an ink-jet printer may be used for the printer 213. The hardware configuration of the distributed processing device 101 has been discussed. Each of the client devices C and the nodes N1-Nn of FIG. 1 has also substantially the same hardware configuration.

Functional Configuration of the Distributed Processing Device

Figure 3:
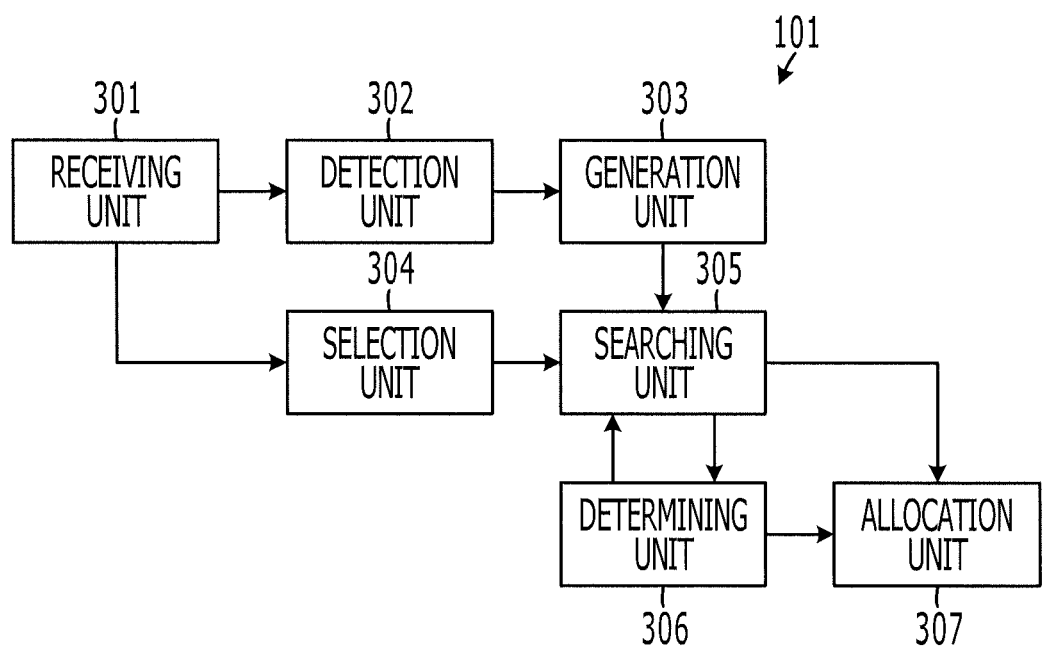
FIG. 3 illustrates an example of a functional configuration of the distributed processing device.

The functional configuration of the distributed processing device 101 of the embodiment is described below. FIG. 3 illustrates an example of the distributed processing device 101. The distributed processing device 101 of FIG. 3 includes receiving unit 301, detection unit 302, generation unit 303, selection unit 304, searching unit 305, determining unit 306, and allocation unit 307. Those units (the receiving unit 301 through the allocation unit 307) may be implemented by causing the CPU 201 to execute the program stored on a storage device such as the ROM 202, the RAM 203, the magnetic disk 205, or the optical disk 207 illustrated in FIG. 2, or may be executed by the interface 209. The process results of the units (the receiving unit 301 through the allocation unit 307) are stored on storage device such as the RAM 203, the magnetic disk 205, or the optical disk 207.

The receiving unit 301 has a function of receiving from the client device C a process request of a process to the record stored on the database 110. The database 110 is a shared database accessed by the nodes N1-Nn. The process on the database 110 includes an update process, a reference process, and a write process on a record stored on the database 110.

The process request may be a digital text or an orderly arranged files. The process request may request a single process or a plurality of processes such as a transaction or a batch job. The process request may be a digital text (data) in a defined schema structure, such as external markup language (XML). The process request includes data as a process target, and an attribute name defining a record including the data.

The attribute name is information identifying the record stored on the database 110. For example, the attribute name includes an item name of data included in the record (field name), or a file name (table name) of a file (table) including each record. The attribute name identifying a single record may include a combination of a file name and an item name, or a plurality of item names.

The attribute name identifying the record is stored beforehand on a recording device such as the ROM 202, the RAM 203, the magnetic disk 205, or the optical disk 207. The attribute name may be set in all records stored on the database 110, or may be set on a particular record on which concurrent accessing from the nodes N1-Nn is to be controlled.

The records on the database 110 are referred to as "records R1-Rm" and attribute names identifying the records R1-Rm are referred to as "attribute names A1-Am." Any record of the records R1-Rm is referred to "record Rj," and any attribute name of the attribute names A1-Am is referred to as "Aj" (j=1, 2, . . . , m).

The detection unit 302 has a function of detecting the attribute name from the process request of a received process. For example, the detection unit 302 detects from the process request a character train (such as a character train enclosed by tags) representing the attribute name in accordance with a data format of the process request. The data format of the process request may be an XML element format or an XML attribute format.

The generation unit 303 generates a bit train on each attribute name Aj identifying the record Rj in response to the detection results. The bit train indicates whether the attribute name Aj is included in the process request of the received process. If the attribute name Aj is included in the process request, the generation unit 303 generates a bit train indicating "1" for each attribute name Aj if the attribute name Aj is included in the process request and generates a bit train indicating "0" if the attribute name Aj is not included in the process request. If the total number of the preset attribute names Aj is m, the resulting bit train becomes m bits.

For example, the attribute name A3 may be included in the received process request with m=5. The bit train indicating whether the attribute names A1-A5 are included in the process requests may be "00100" in the order of the attribute names A1-A5. The bit train helps easily identify the attribute name Aj included in the process request of the process (the attribute name A3 in the above example).

The selection unit 304 has a function of selecting a first process from among a process group to the database 110. The process group to the database 110 refers to a set of unexecuted processes of received process requests. In the discussion that follows, the process group to the database 110 is referred to as a process group of "processes T1-TK," and any process of the process group T1-TK is referred to as "process Tk" (k=1, 2, ..., K).

The selection unit 304 may select as the first process a process of a process request having the oldest reception time from among the process group T1-TK to the database 110. Alternatively, the selection unit 304 may select as the first process a process Tk having the highest priority from among the process group T1-TK that have been prioritized.

The searching unit 305 searches the process group T1-TK for a second process in accordance with the attribute name Aj identifying each record Rj. The second process has as a process target a record having an attribute name different from the attribute name included in the process request of the selected first process. For example, the searching unit 305 searches for the second process in accordance with bit trains, each bit train generated on a per generated process Tk. The second process does not include substantially the same attribute name as the attribute name included in the process request of the first process.

The first process may have a bit train of "10000." The searching unit 305 searches for, as the second process, the process Tk of the bit train having at least a first bit of "0" from among the process group T1-TK. In this case, the searching unit 305 may search for, as the second process, the process Tk having the bit train with the first bit of "0" and having the oldest reception time of the process request from among the process group T1-TK.

The determining unit 306 determines the first process and the second process as execution targets to be executed by the nodes N1-Nn if the second process is hit. Since the first process and the second process have different attribute names included the process requests thereof, the records as process targets are also different. Even if the nodes N1-Nn concurrent execute the first and second processes, accessing to substantially the same record does not occur.

The searching unit 305 searches the process group T1-TK for a third process from among the process group T1-TK. The third process has as a process target a record having an attribute name different from the attribute name of the process request of the determined execution target. For example, in response to a generated bit train of each of the process Tk, the searching unit 305 searches for as the third process a process not having substantially the same attribute name as the attribute name included in the process request of the execution target. The search process of the searching unit 305 for searching for the third process is repeated until a process count X of the execution target determined by the determining unit 306 reaches the number of nodes n of the nodes N1-Nn. For example, third processes of a maximum of (n−2) excluding, from the number of nodes n, two processes as the first and second processes are searched for until a condition of "X=n" is satisfied.

For example, two processes as execution targets having bit trains of "10000" and "01000" are determined. In this case, the searching unit 305 searches the process group T1-TK for the process Tk as the third process with the bit train having a first bit of "0" and a second bit of "0." In this case, the searching unit 305 may search for as the third process the process Tk having the bit train with a first bit of "0" and a second bit of "0," and having the oldest process request time from among the process group T1-TK.

The determining unit 306 may determine the third process as an execution target if the third process is hit. In one embodiment, the determining unit 306 may determine the third process with the node Ni as an allocation destination mapped thereto.

The allocation unit 307 has a function of allocating the determined execution target to one of the nodes N1-Nn. For example, the allocation unit 307 transmits the process request of the process as the determined execution target to the node Ni as an allocation destination. If a plurality of processes as execution targets are present, the allocation unit 307 allocates the processes to different nodes Ni. As a result, the plurality of nodes N1-Nn perform the plurality of processes as the execution targets in parallel.

The allocation unit 307 may allocate the determined execution target to the nodes N1-Nn if the third process is not hit by the searching unit 305. Since a process having a record as a process target different from the record of the previously determined process as the execution target is not present among the process group T1-TK, the allocation unit 307 thus allocates the determined execution target to the nodes N1-Nn at this point of time.

If the process count X of the determined execution targets reaches the number of nodes n of the nodes N1-Nn, the allocation unit 307 may allocate the determined execution targets to the nodes N1-Nn. No further node Ni is present even if a process is determined as an execution target. At this point of time, the allocation unit 307 allocates the determined execution targets to the nodes N1-Nn.

Distributed Processing Process of the Distributed Processing Device

Figure 4:
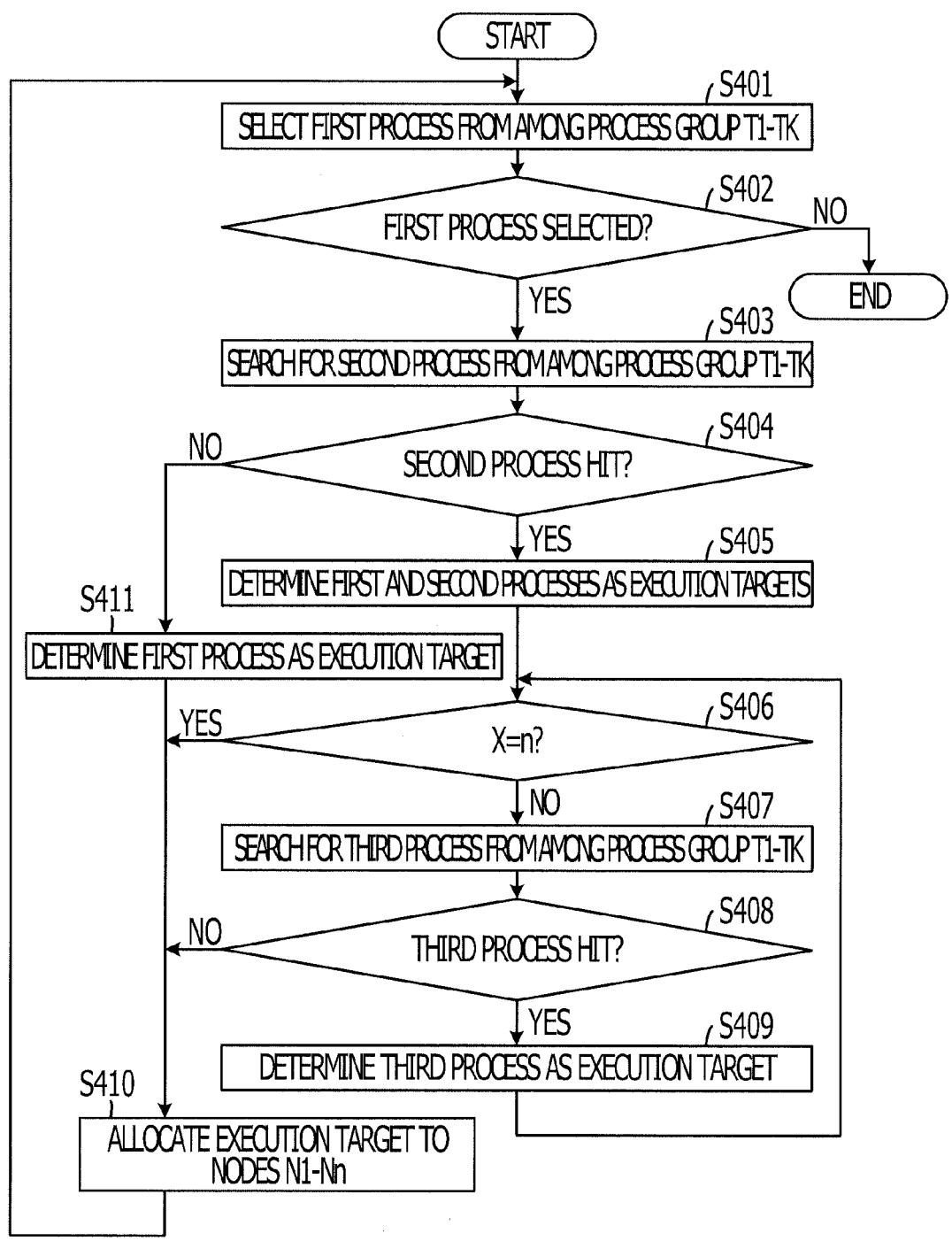
FIG. 4 is a flowchart illustrating a distributed processing process of the distributed processing device.

The distributed processing process of the distributed processing device 101 of the embodiment is described below. FIG. 4 is a flowchart illustrating an example of the distributed processing process of the distributed processing device 101 of the embodiment. In the process of the flowchart of FIG. 4, the selection unit 304 selects the first process from among the process group T1-TK to the database 110 (S401).

The selection unit 304 determines whether the first process is selected (S402). If the first process is selected (yes from S402), the searching unit 305 searches the process group T1-TK for the second process (S403). The second process has as a process target a record with an attribute name different from the attribute name of the process request of the first process.

The searching unit 305 determines whether the second process is hit (S404). If the second process is hit (yes from S404), the determining unit 306 determines that the first and second process are the execution targets to be executed by the nodes N1-Nn (S405).

The determining unit 306 determines whether the process count X of the determined execution targets has reached the number of nodes n of the nodes N1-Nn (S406). If the process count X has not reached the number of nodes n (no from S406), the searching unit 305 searches the process group T1-TK for the third process (S407). The third process has a record as a process target with an attribute name different from the attribute name included in the process request of the determined execution target.

The searching unit 305 determines whether the third process is hit (S408). If the third process is hit (yes from S408), the determining unit 306 determines the third process as an execution target to be executed by the nodes N1-Nn (S409). Processing returns to S406.

If the third process is not hit (no from S408), the allocation unit 307 allocates the determined execution targets to the nodes N1-Nn (S410). Processing returns to S401. If the second process is not hit (no from S404), the allocation unit 307 allocates the determined execution targets to the nodes N1-Nn (S410). Processing returns to S401.

If the process count X has reached the number of nodes n (yes from S406), the allocation unit 307 allocates the determined execution targets to the nodes N1-Nn (S410). Processing returns to S401.

If it is determined in S402 that the first process is not selected (no from S402), the series of operations of the flowchart is complete. Since no process Tk is present as a distributed processing target, the distributed processing device 101 ends the distributed processing process. If it is determined in S404 that the second process is not hit (no from S404), the determining unit 306 determines an execution target to be executed by the nodes N1-Nn (S411). Processing proceeds to S410.

As described above, the distributed processing device 101 of the embodiment searches the process group T1-TK for the second process in accordance with the attribute names A1-Am identifying the records R1-Rm on the database 110. The second record has a record different from the record of the first process. If the second process is hit, the distributed processing device 101 determines the first and second processes as the execution targets and then allocates the first and second processes to the nodes N1-Nn. The first and second processes having no access contention on substantially the same record are executed in parallel.

The distributed processing device 101 searches the process group T1-TK for the third process different from the determined execution target, and then determines the third process as the execution target. The third process not causing the access contention on substantially the same record is also executed in parallel.

If the third process is not hit, the distributed processing device 101 may allocate the determined execution target to the plurality of nodes N1-Nn. The execution targets are allocated to the nodes N1-Nn at the moment any process having the record different from the record of the determined execution target becomes unavailable. Efficiency is increased in the distributed processing of the process group T1-TK to the nodes N1-Nn.

The distributed processing device 101 searches for one of the second and third processes depending on the bit train of each process request indicating whether the attribute name Aj identifying the record Rj is included. The attribute name Aj included in each process request is easily identified. The search process of searching for one of the second and third processes is efficiently performed.

When the process group T1-TK is distributed-processed by the nodes N1-Nn, the distributed processing device 101 prevents processes having as the record the process target of substantially the same name from being allocated at substantially the same timing. Concurrent accessing to substantially the same record is avoided. The distributed processing device 101 reduces the waiting time before the release from the lock state in exclusive control of access to substantially the same record. Throughput of the network system 100 is increased.

The distributed processing device 101 of the embodiment is described below. The distributed processing process of transaction data of the forward proxy device 600 incorporating the distributed processing device 101 is discussed below.

Figure 6:
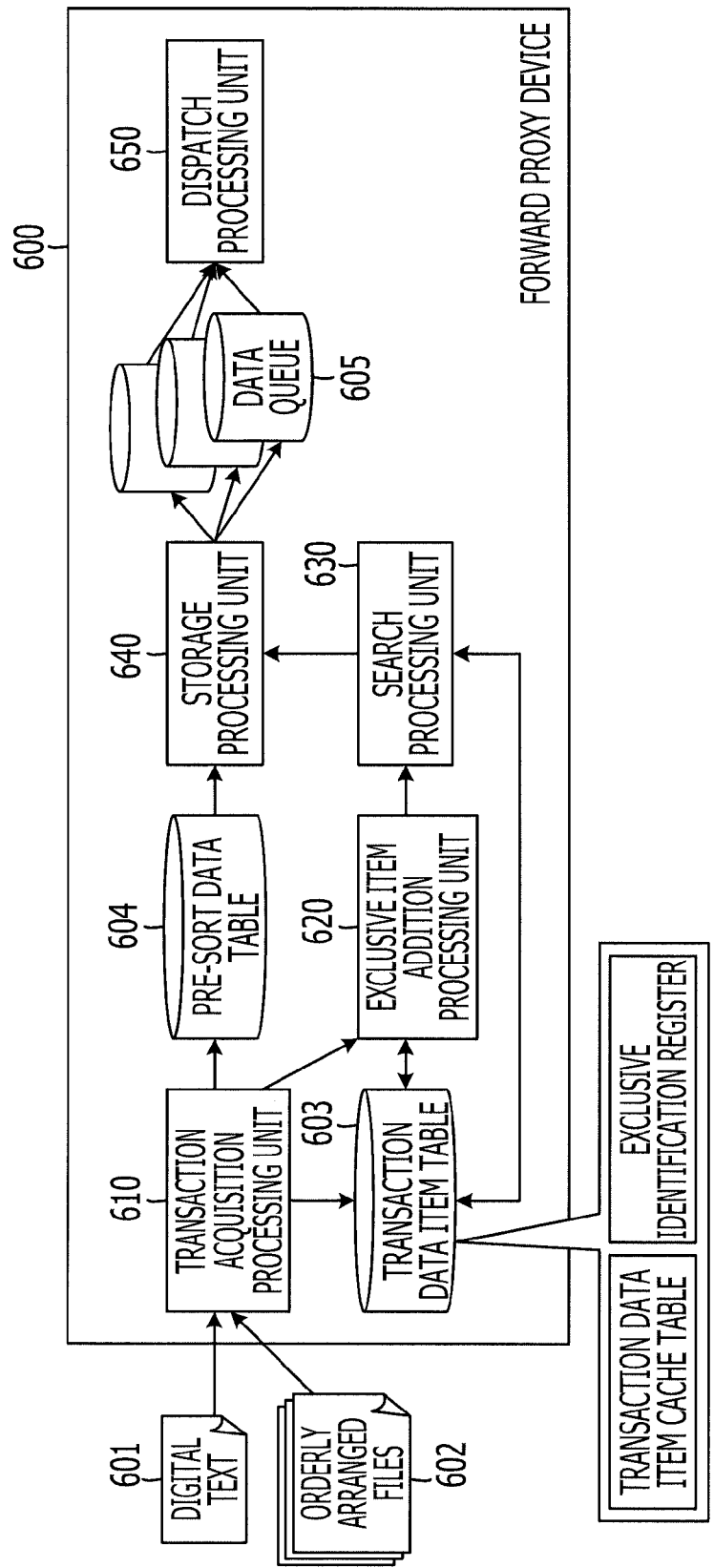
FIG. 6 illustrates a forward proxy device to which the distributed processing device of the embodiment is applied.

FIG. 5 illustrates an example of a data table 500 of data as a process target. FIG. 6 illustrates the forward proxy device 600 to which the distributed processing device of the embodiment is applied. The forward proxy device 600 of FIG. 6 acquires transaction data such as the data table 500 of FIG. 5 and causes each process node to process the transaction data. The data table 500 includes entities and attributes. The transaction data handled by the forward proxy device 600 includes one record in the database based on an attribute of the data table 500. The transaction data corresponds to the process request of the process.

As illustrated in FIG. 6, the forward proxy device 600 acquires at a time the transaction data requesting a process on a common database, and then sorts the transaction data to process nodes performing parallel processes on the common database, for example, process nodes "1," "2," and "3" as illustrated below with reference to FIG. 14. The process nodes "1," "2," and "3" respectively correspond to the node Ni of the nodes N1-Nn.

The transaction data may be a digital text 601 input by an online client and orderly arranged files 602 input as a batch file of a batch job. The forward proxy device 600 acquires the above-described transaction data as a process request to the common database and then temporarily stores the transaction data. Unprocessed transaction data units of the stored transaction data are then sorted to the process nodes, and then processed in parallel.

When the process nodes process the transaction data in the parallel process, the forward proxy device 600 extracts the transaction data that prevents substantially the same record from being set as a process target, and then sorts the transaction data to the process nodes. The transaction data to be parallel-processed assures exclusiveness among the records as the process targets.

The process nodes receiving the transaction data sorted by the forward proxy device 600 are free from access contention to substantially the same record on substantially the same database during the execution of the parallel process. The network system 100 is thus free from a lock state of a load distributed device of related art caused by access centering on substantially the same record, and a drop in the process efficiency of the load distributed device caused by the process node forced into a standby state.

In one embodiment, the forward proxy device 600 as functional units implementing the units of the distributed processing device 101 includes transaction acquisition processing unit 610, exclusive item addition processing unit 620, search processing unit 630, storage processing unit 640, and dispatch processing unit 650.

The transaction acquisition processing unit 610 has the function of the receiving unit 301 in the distributed processing device 101. The transaction acquisition processing unit 610 receives at a time the processes to the database storing a plurality of records. The exclusive item addition processing unit 620 corresponds to the detection unit 302 and the generation unit 303. The exclusive item addition processing unit 620 generates for each transaction data a bit train representing an attribute name identifying a record as an access destination.

The search processing unit 630 corresponds to the selection unit 304 and the searching unit 305 in the distributed processing device 101. The forward proxy device 600 searches any transaction data or the oldest transaction data for a first process and another transaction data for a second process. The storage processing unit 640 corresponds to the determining unit 306 in the distributed processing device 101. The processing of the transaction data by each process node is controlled by the dispatch processing unit 650. The process of each of those units is described in detail below.

The forward proxy device 600 includes, as storage areas storing data, transaction data item table 603, pre-sort data table 604, and data queue 605 for each process node. The operation of the storage areas is described in detail together with related functional units. The transaction data item table 603 includes a fast-access transaction data item cache and an exclusive identification register.

Data Structure

The data structure of the transaction data to be input to the forward proxy device 600 is described before the discussion of the load distributed processing process of the forward proxy device 600. In response to information included in the acquired transaction data, the forward proxy device 600 identifies a record that is accessed in the processing of the transaction data. If the process nodes perform parallel processes onto the common database, the transaction data is sorted in the processes of the process nodes such that substantially the same record is not accessed at a time.

The forward proxy device 600 references, in the acquired transaction data, the information identifying the record to be accessed in the execution of the process, and prepares beforehand information indicating which record is to be accessed. The forward proxy device 600 identifies as a process target any data of an entity listed in the data table 500 (see FIG. 5) in accordance with the data format of the acquired transaction data. In response to the identified data as the process target, the forward proxy device 600 identifies a record to be accessed when the process node processes the transaction data.

Figure 7:
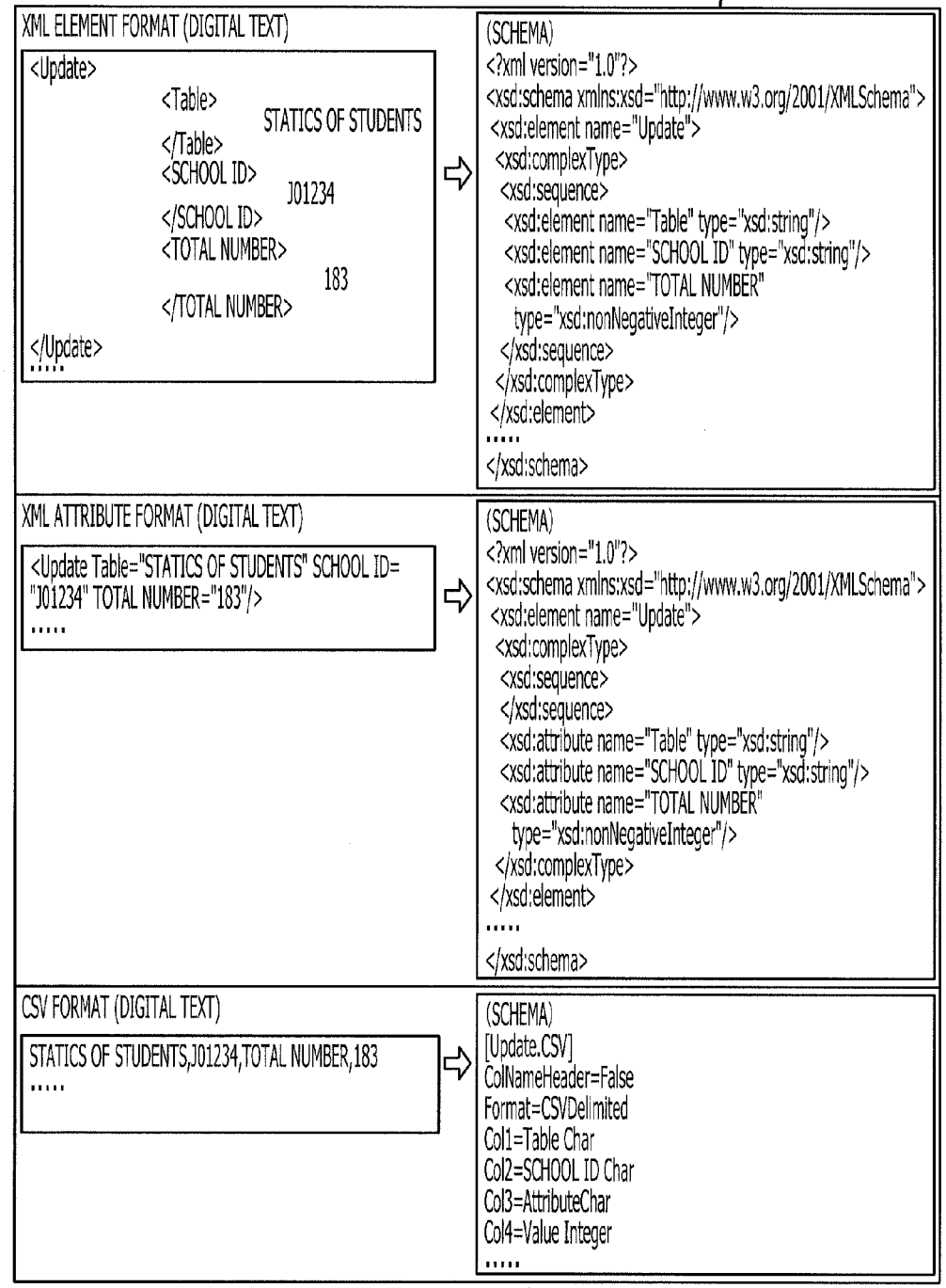
FIG. 7 illustrates an acquisition process of a digital text of various formats and schema.

FIG. 7 illustrates a digital text of various formats and acquired schema. A data train 700 of FIG. 7 represents a specific format of a digital text 601 to be input to the forward proxy device 600 and a schema meaning specifications of display contents of the digital text 601 on a per data format basis. The data train 700 of FIG. 7 lists, as the formats of the digital text 601, (A) XML element format, (B) XML attribute format, and (C) comma separated values (CSV) format. In the digital text 601 of any format, a process to update the total number to "183" in a record of school ID "JO1234" in statistics of students table is written.

Figure 8:
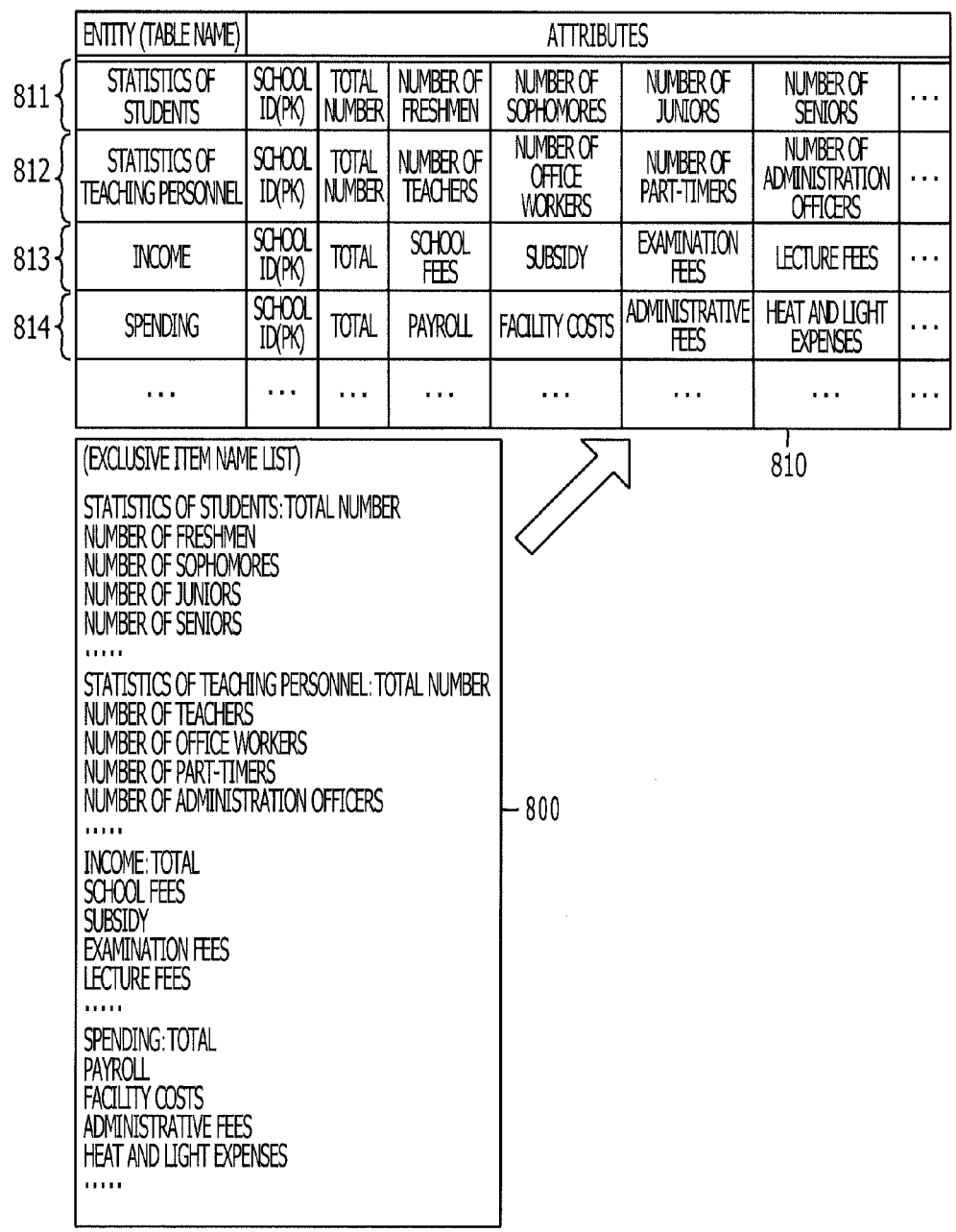
FIG. 8 illustrates a definition of an exclusive item name.

FIG. 8 illustrates the definition of an exclusive item name. In the forward proxy device 600, an exclusive item name list as denoted by a data train 800 of FIG. 8 is set. The exclusive item name list includes "statistics of students," "statistics of teaching personnel," "income," "spending" set as the exclusive item names. A data table 810 to be accessed in the execution of the process is determined depending on the data of the attribute of each exclusive item name of the transaction data.

Using the data table 810 having attributes and exclusive item names set in substantially the same row, an exclusive item name is uniquely identified from an attribute included in the transaction data. For example, if the forward proxy device 600 acquires the digital text 601 illustrated in the data train 700 of FIG. 7, an exclusive item name is identified from an attribute included in the digital text 601. The exclusive item name is not an actual name, such as "statistics of students," or "statistics of teaching personnel," but identifier in order to identify itself with a fewer bit numbers as listed below:

Attribute 811 related to statistics of students: exclusive item name A;

Attribute 812 related to statistics of teaching personnel: exclusive item name B;

Attribute 813 related to income: exclusive item name C;

Attribute 814 related to spending: exclusive item name D; and

Any attribute of remainder: exclusive item name E.

Data having attributes set in substantially the same exclusive item name is stored on substantially the same record. If the digital text 601 includes attribute 811 related to statistics of students, the digital text 601 has the exclusive item name A as a process target in the above setting. If the digital text 601 includes a plurality of exclusive item names, such as the exclusive item names A and C as a process target, a plurality of records are accessed in accordance with a single unit of transaction data.

Transaction Acquisition Processing Unit

Figure 9:
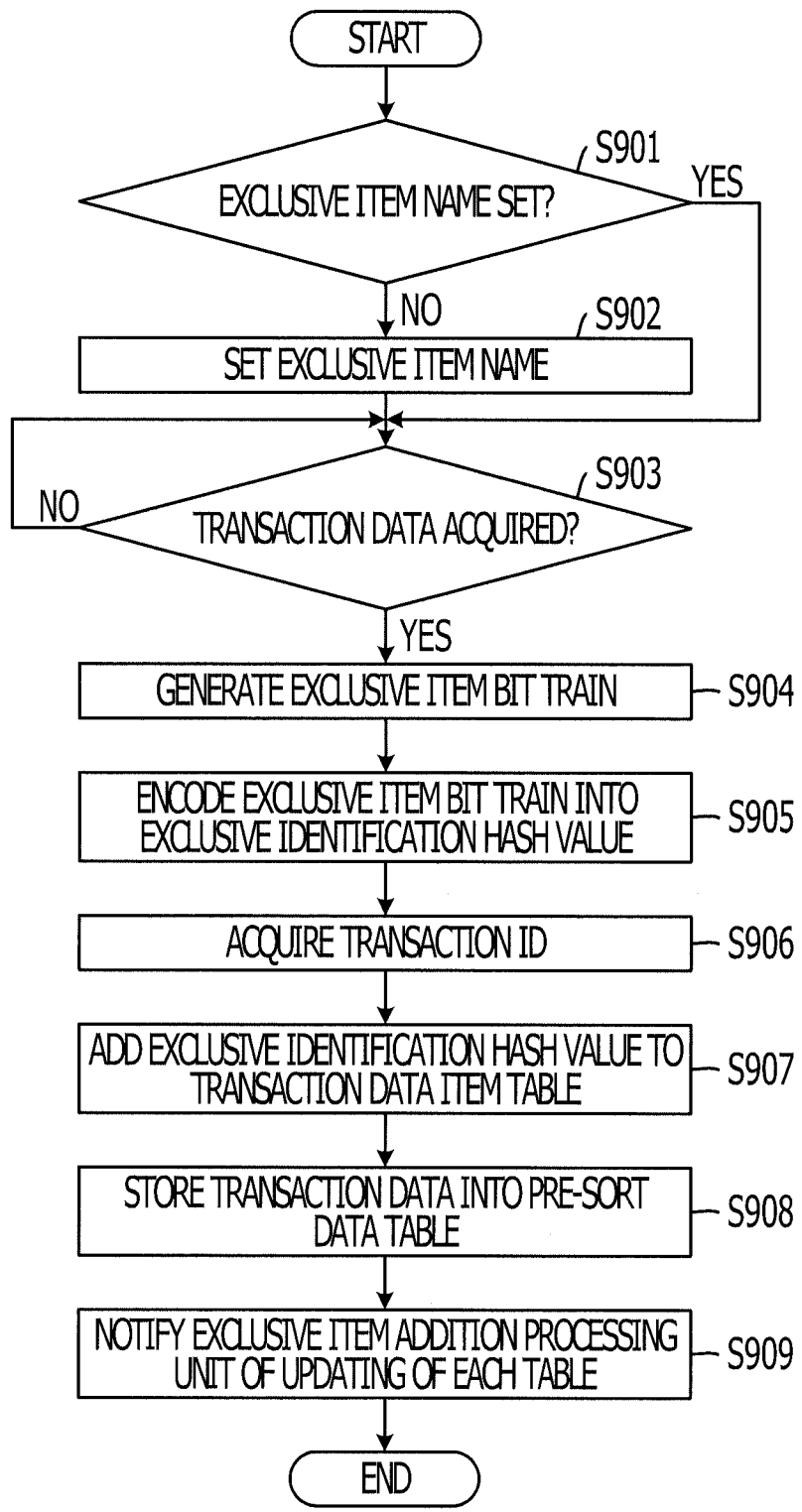
FIG. 9 is a flowchart illustrating a transaction acquisition process.

FIG. 9 is a flowchart illustrating a process of the transaction acquisition processing unit 610. The transaction acquisition processing unit 610 acquires the transaction data with the common database as a process target as illustrated in the flowchart in FIG. 9. The transaction acquisition processing unit 610 starts the process thereof in response to an inputting of the transaction data (such as the digital text 601 and the orderly arranged files 602) from an online client as a trigger.

As illustrated in FIG. 9, the transaction acquisition processing unit 610 determines in a pre-process whether an "exclusive item name" as a keyword for extracting an exclusive target is set (S901). If no exclusive item name is set in S901 (no from S901), the transaction acquisition processing unit 610 receives an instruction from a designer or an upper system of the distributed processing device 101, and then sets an exclusive item name (S902).

In operation S902, five exclusive item names "A," "B," "C," "D," and "E" are set in the forward proxy device 600. If the forward proxy device 600 determines in S901 that the exclusive item name is set (yes from S901), processing proceeds to S903.

The transaction acquisition processing unit 610 determines whether the transaction data has actually been acquired (S903). In S903, the transaction acquisition processing unit 610 waits on standby for the transaction data (no loop from S903). If it is determined in S903 that the transaction data has been acquired (yes from S903), the transaction acquisition processing unit 610 generates an "exclusive item bit train" in a preparatory operation to successively check exclusive conditions of the transaction data (S904).

The transaction acquisition processing unit 610 encodes the "exclusive item bit train" generated in S904 into an exclusive identification hash value (S905), and acquires a transaction ID (S906). The transaction ID is a serial number to identify the transaction data from other transaction data, and the order of the acquisition by the transaction acquisition processing unit 610.

The "exclusive item bit train" represents the exclusive item name (record unit) accessed when the transaction data is processed. If the exclusive item bit train corresponding to the exclusive item names "A, B, C, D, and E" is "01011," the transaction data refers to the exclusive item names B, D, and E with the bits thereof set.

The generated exclusive item bit train "01011" is encoded into an exclusive identification hash value, and thus becomes "11" in the decimal number system. In the embodiment, the exclusive identification hash value is a decimal number. The exclusive identification hash value may be any representation system, such as the hexadecimal numbering system, as long as it is reversible back to the exclusive item bit train.

The transaction acquisition processing unit 610 then adds to the transaction data item table 603 the exclusive identification hash value encoded in S905 with the transaction ID acquired in S906 as a key (S907). The transaction acquisition processing unit 610 stores onto the pre-sort data table 604 data acquired in accordance with the transaction ID as a key (the transaction data corresponding to process content) (S908).

With the new transaction data acquired, the transaction acquisition processing unit 610 notifies the exclusive item addition processing unit 620 that the transaction data item table 603 and the pre-sort data table 604 have been updated (S909). The series of operations is thus complete.

As described above, the transaction acquisition processing unit 610 acquires at a time the transaction data of the process that is performed on the common database, and then temporarily stores the transaction data on the pre-sort data table 604 before the transaction data is sorted to each process node. Concurrently, the transaction acquisition processing unit 610 performs a preparatory process that prevents substantially the same record from being accessed in the parallel processes of the process nodes in a subsequent phase. The preparatory operation corresponds to the production process performed by the transaction acquisition processing unit 610 to generate the exclusive item bit train to sort the transaction data.

The transaction acquisition processing unit 610 encodes the exclusive item bit train generated from the transaction data into the exclusive identification hash value, and then stores the exclusive identification hash value onto the transaction data item table 603. The encoding process substantially reduces a memory capacity for storing the exclusive item bit train of each transaction data. Even if the transaction data centers on the forward proxy device 600, no overflow takes place. The transaction data is efficiently sorted.

Exclusive Item Addition Processing Unit

Figure 10:
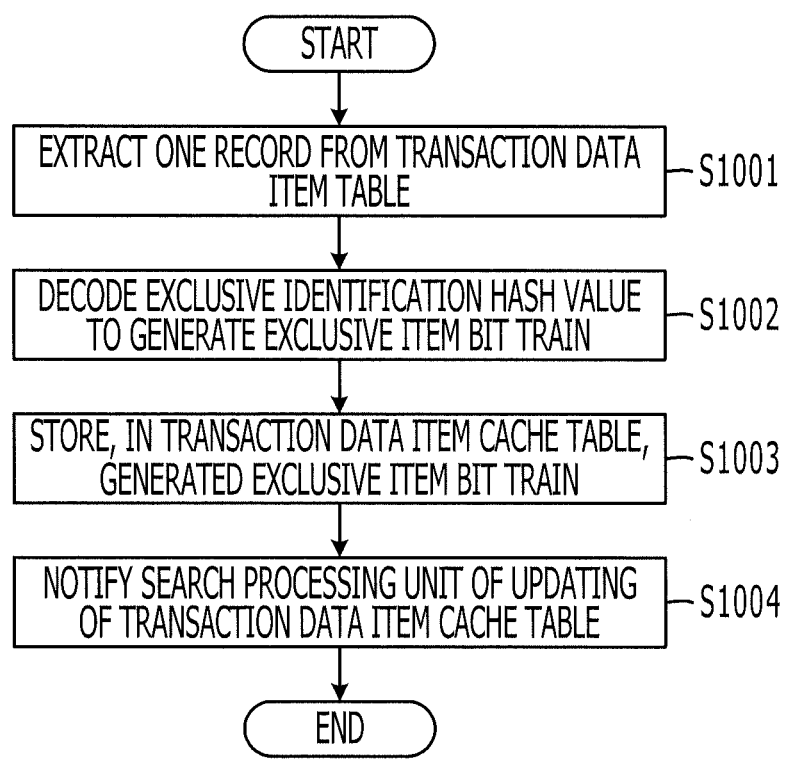
FIG. 10 illustrates a flowchart of an exclusive item addition process.

FIG. 10 is a flowchart illustrating a process of the exclusive item addition processing unit 620. The exclusive item addition processing unit 620 adds to the transaction data item cache table the transaction data acquired by the transaction acquisition processing unit 610, as the transaction data to be processed by each process node, together with the exclusive item bit train.

The exclusive item addition processing unit 620 extracts one record from the transaction data item table 603 (S1001). The extraction operation in S1001 is performed if a notification notifying of the update of the transaction data item table 603 and the pre-sort data table 604 is received from the transaction acquisition processing unit 610 and if an empty cell is created in the transaction data item cache table. Even if the notification is received from the transaction acquisition processing unit 610, the exclusive item addition processing unit 620 continues a standby state until an empty cell is created in the transaction data item cache table.

FIG. 11 illustrates a storage example of the transaction data item cache table. The transaction data item file 603 includes the transaction data item cache table as a fast-access cache table as illustrated in FIG. 11. The transaction data item cache table lists the exclusive item bit trains, each generated for each transaction data responsive to the transaction ID on a per transaction ID basis.

The exclusive item addition processing unit 620 decodes the exclusive identification hash value of the record extracted in S1001 to generate the exclusive item bit train (S1002). The operation in S1002 restores the exclusive identification hash value (decimal number) mapped to the transaction ID back to the exclusive item bit train (binary number) generated in S904 (see FIG. 9).

The exclusive item addition processing unit 620 adds to the transaction data item cache table the exclusive item bit train, generated in S1002, with the transaction ID as a key (S1003).

FIG. 15 illustrates an addition process of the exclusive item bit train to the transaction data item cache table. The exclusive item bit train may be generated from the exclusive identification hash value mapped to the transaction ID:20 in S1002. Through the operation in S1003, an exclusive item bit train 1120 of FIG. 15 is added to the transaction data item cache table.

Returning to the discussion of FIG. 10, subsequent to S1003, the exclusive item addition processing unit 620 notifies the search processing unit 630 that the transaction data item cache table has been updated in S1003 (S1004). The series of operation is thus complete.

As described above, the exclusive item addition processing unit 620 adds to the transaction data item cache table the exclusive item bit train of the newly acquired transaction data together with the transaction ID. The storage of the exclusive item bit train in the transaction data item cache table means that the newly acquired transaction data has been registered as one of the transaction data units as a target to be sorted to the process node.

Search Processing Unit

Figure 12:
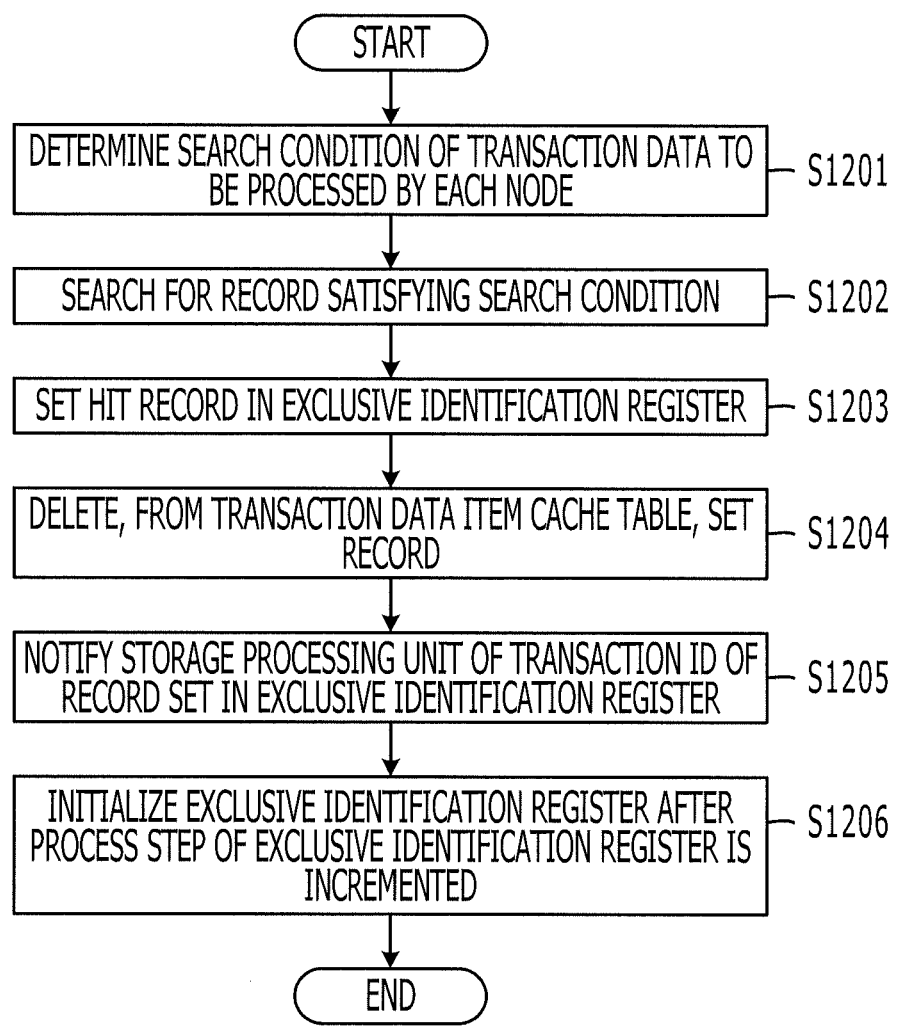
FIG. 12 is a flowchart illustrating a search process.

FIG. 12 is a flowchart of a process of the search processing unit 630. Using the transaction identification register, the search processing unit 630 searches for the transaction ID of the transaction data processed in substantially the same process by the process nodes "1," "2," and "3" from among the transaction IDs stored on the transaction data item cache table.

The exclusive item bit train is to be set in the exclusive identification register. To this end, the search processing unit 630 determines a search condition of the transaction data to be processed by the process nodes "1," "2," and "3" (S1201). In response to the exclusive item bit train stored in the transaction data item cache table, the search processing unit 630 determines a unique search condition. The following two criteria serve as the search condition: 1) none of the bits of the exclusive item bit train already set in the exclusive identification register and a common exclusive item name are set ("0's" are set), and 2) the exclusive item bit train is the oldest from among those stored in the transaction data item cache table.

The search processing unit 630 searches the transaction data item cache table for a record satisfying the search condition determined in S1201 (S1202). The search processing unit 630 sets the record hit in S1202 on the exclusive identification register corresponding to each process node (S1203). After setting the record on the exclusive identification register in S1203, the search processing unit 630 deletes the set record from the transaction data item cache table (S1204).

Figure 16:
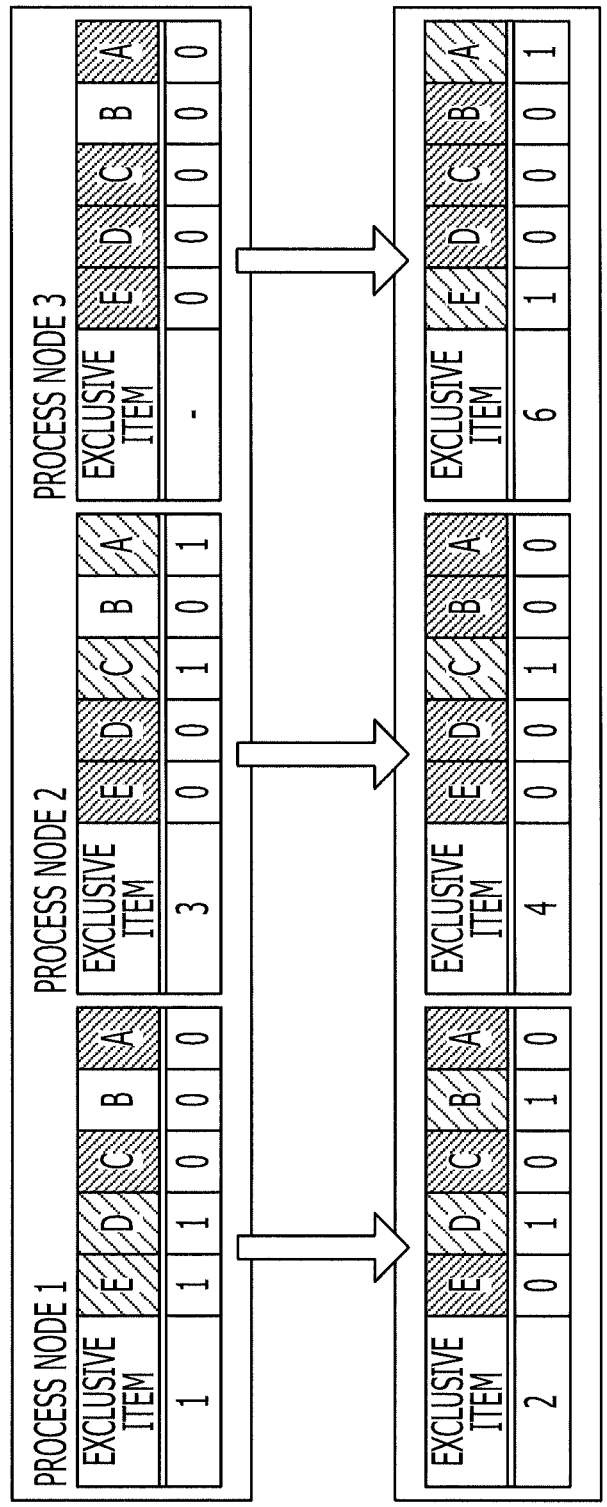
FIG. 16 illustrates a setting process of an exclusive identification register of each process node.

FIG. 16 illustrates a setting example of the exclusive identification register of each process node. Operations S1201-S1204 are specifically discussed with reference to FIG. 16. As illustrated in FIG. 16, the exclusive identification register is arranged on a per process node basis. The search processing unit 630 sets the exclusive item bit train on the exclusive identification register corresponding to the process node "1" in accordance with the search condition. The setting of the exclusive identification register starts with the process node "1," in other words, an unset state of the exclusive identification register.

The exclusive item bit train of the exclusive identification register corresponding to the process node "1" is the oldest exclusive item bit train stored in the transaction data item cache table because it is not necessary to reference another exclusive item bit train of another exclusive identification register. As previously discussed with reference to the transaction acquisition processing unit 610, each transaction ID is serially numbered.

The exclusive item bit train having the smallest transaction ID is thus the oldest exclusive item bit train. The exclusive item bit train having the transaction ID:1 is set in the exclusive identification register corresponding to the process node "1." If the exclusive item bit train is set, the record set in S1204 (the exclusive item bit train corresponding to the transaction ID:1) is deleted from the transaction data item cache table.

The exclusive item bit train to be set in the exclusive identification register corresponding to the process node "2" is from one of the exclusive item bit trains stored in the transaction data item cache table and not contending with each bit set in the exclusive identification register. The search processing unit 630 thus searches for the exclusive item bit train satisfying the search condition 1) and 2). In other words, the oldest exclusive item bit train and not having exclusive item names D and E is searched for. As a result, the exclusive item bit train corresponding to the transaction ID:3 is set in the exclusive identification register corresponding to the process node "2."

In the exclusive identification register illustrated in the upper portion of FIG. 16, the search processing unit 630 has not hit the exclusive item bit train not contending for the exclusive item name with the exclusive identification registers corresponding to the process nodes "1" and "2" from the transaction data item cache table. Processing ends with no exclusive item bit train set for the process node "3."

In the exclusive identification register in the lower portion of FIG. 16, the search processing unit 630 has not hit an exclusive item bit trains not contending for the exclusive item name with the exclusive identification registers corresponding to the process nodes "1" and "2" from the transaction data item cache table. Processing ends with exclusive item bit trains respectively set for all the process nodes "1," "2," and "3."

Figure 17:
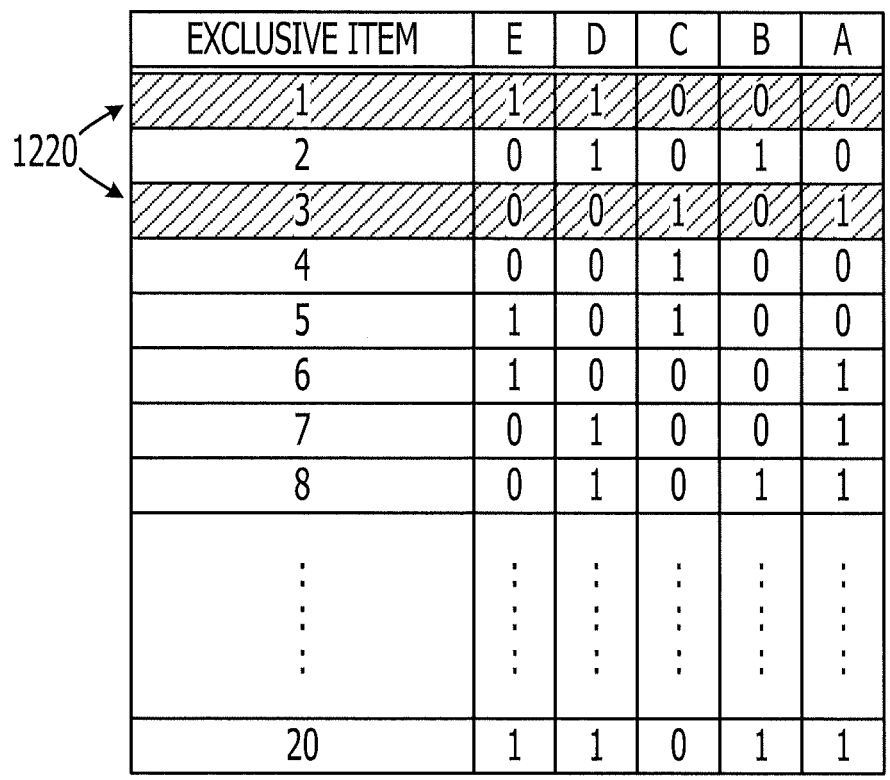
FIG. 17 illustrates a deletion process on the transaction data item cache table subsequent to the updating of the exclusive identification register.

FIG. 17 illustrates an deletion process to the transaction data item cache table subsequent to the updating of the exclusive identification register. If the exclusive item bit trains are set in the exclusive identification registers corresponding to the process nodes "1" and "2," the records 1220 of the transaction ID:1 and the transaction ID:3 are deleted from the transaction data item cache table as in FIG. 17.

Returning to the discussion of FIG. 12, in parallel with the operation in S1204, the search processing unit 630 notifies the storage processing unit 640 of the transaction IDs to be executed by the process nodes "1," "2," and "3" and the process node names (S1205) after setting the exclusive identification register in S1203. Finally, the search processing unit 630 increments the operation of the exclusive identification register after the notification operation in S1205 and initializes the exclusive identification register (S1206). The series of operations is thus complete.

As described above, using the exclusive identification register, the search processing unit 630 causes the process nodes to process in the parallel process the transaction data that has no duplicate exclusive item name. When the transaction data and the process node processing the transaction data are set, a younger transaction ID, i.e., older transaction data is set with a higher priority. The waiting time of the transaction data is kept to a minimum.

Storage Processing Unit

Figure 13:
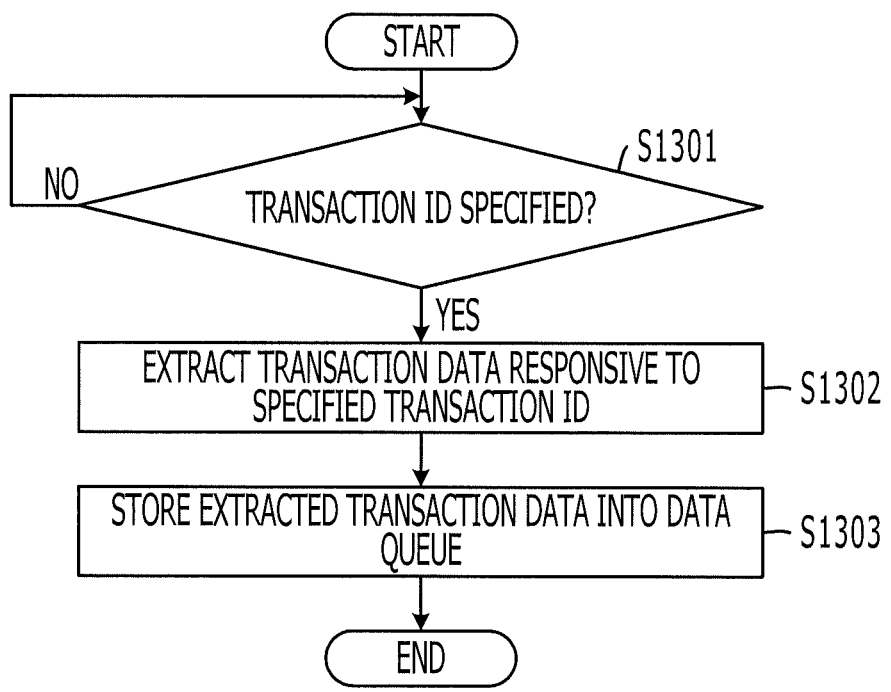
FIG. 13 is a flowchart illustrating a storage process.

FIG. 13 illustrates a flowchart of a process of the storage processing unit 640. The storage processing unit 640 stores on the data queue 605 the transaction data stored on the pre-sort data table 604 (such as the digital text 601 and the orderly arranged files 602) in response to a notification from the search processing unit 630.

The storage processing unit 640 determines whether a transaction ID is specified by the notification from the search processing unit 630 (S1301). The storage processing unit 640 waits on standby until the transaction ID is specified (no loop from S1301). If the transaction ID is specified (yes from S1301), the storage processing unit 640 extracts the transaction data, corresponding to the transaction ID specified in the notification from the search processing unit 630, from among the transaction data stored on the pre-sort data table 604 (S1302).

The storage processing unit 640 stores the transaction data extracted in S1302 on the data queue 605 of the process node name specified in the notification from the search processing unit 630 (S1303). If the process node "1" is specified as a process node of the transaction ID:1, the transaction data corresponding to the transaction ID:1 is stored on the data queue 605 of the process node "1."

As described above, the storage processing unit 640 performs the preparatory process such that the transaction data searched for by the search processing unit 630 is processed by each process node. For example, the storage processing unit 640 sorts the transaction data, searched for processes to be performed as substantially the same processes, to the data queue 605 that actually causes the process node to process the transaction data.

Dispatch Processing Unit

Figure 14:
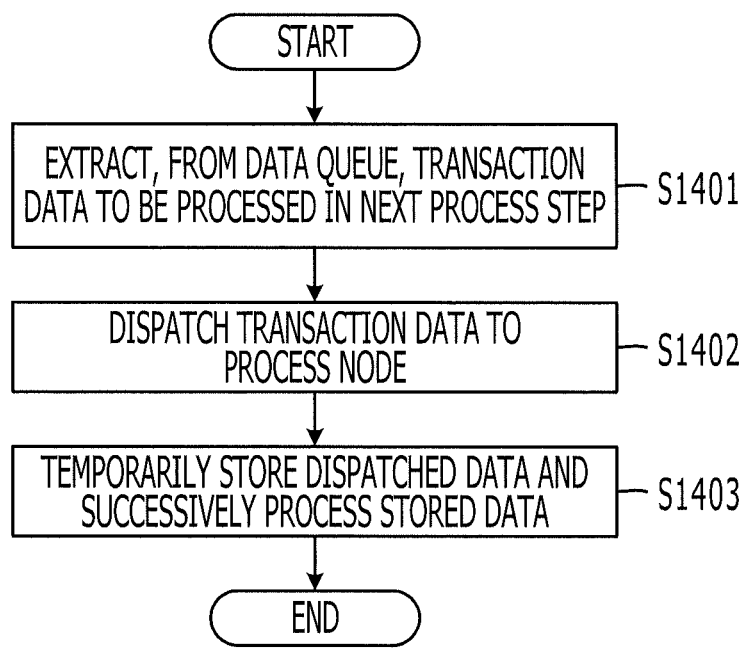
FIG. 14 is a flowchart illustrating a dispatch process.

FIG. 14 is a flowchart of a process of the dispatch processor 650. The dispatch processor 650 has a dispatch function of causing the process node to perform a transaction stored on the data queue 605.

The dispatch processor 650 extracts, from the data queues 605, all data to be processed in a next process (S1401). For example, the dispatch processor 650 extracts data actually used in the next process, i.e., the transaction data from the storage processing unit 640 storing the data actually used in the next process, from among the data queues 605 corresponding to the process node "1," the process node "2," and the process node "3."

The dispatch processor 650 dispatches the transaction data extracted from the data queue 605 to each process node (S1402). Finally, the dispatch processor 650 causes a data queue in each process node to store the dispatched data temporarily. The dispatch processor 650 enables the process nodes to perform the processes successively (S1403). The series of operations is thus complete.

As described above, the dispatch processor 650 dispatches the transaction data stored on the data queue 605 to the process nodes at a common timing. The process nodes thus perform the parallel processes thereof.

Applications of the Distributed Processing Process of the Embodiments

As described above, the distributed processing process of the embodiments is particularly effective in the update process of master data that is to be processed on a near-real-time basis. For example, the distributed processing process finds applications in an on-line ticket reservation system for hotels, transportation, events, and the like.

In the on-line ticket reservation system, accessing may center on substantially the same record such as a highly favored seat or room. In the related art distributed processing process, accessing centered on substantially the same record leading to a lock state affects the entire system. For example, accessing for the process request of a reservation on a modestly favored seat or room suffers from a waiting time longer than that of normal process request caused by a lock state as a result of access centering.

The distributed processing process of the embodiment avoids a lock state that could be otherwise caused by the access centering on substantially the same record. The process requests of a reservation on a modestly favored seat or room are typically exclusive with an access-centered record, and are successively sorted. The lock state is avoided, and throughput of the entire system is maintained. The waiting time for the process requests of a reservation on a modestly favored seat or room is reduced.

The distributed processing process of the embodiment may find applications in an online warehouse management system that receives process requests from a plurality of customers. As in the reservation system, process requests are different in frequency between popular commercial products and other products in the online warehouse management system. The system is free from the lock state even if the process requests center on the popular product. The parallel process is performed on the database, and the process efficiency of the system is increased.

The distributed processing process of the embodiment may be executed by causing one of a personal computer and a workstation to execute a prepared distributed processing program. The distributed processing program may be stored on one of the computer readable recording media including a hard disk, a flexible disk, a compact disk-read-only memory (CD-ROM), a magneto-optical disk (MO), and a digital versatile disk (DVD). The distributed processing program is executed by reading the program onto a computer from the recording medium. The distributed processing program may be supplied via a network such as the Internet. The computer readable recording media may be non-transitory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A distributed processing device, comprising:
a memory configured to store a program; and
a processor configured, based on the program, to:
search, in accordance with attribute names identifying a plurality of records stored in a database, a process group for a second process having as a process target a record of an attribute name different from an attribute name included in a process request of a first process selected from among the process group to the database;
determine the first process and the second process as an execution target to be executed by a plurality of nodes when the search indicates a hit corresponding with the second process;
allocate the execution target determined across the plurality of nodes that execute respective processes in parallel to the database;
receive a process request of a process to the database; and
generate a bit train for each attribute name identifying each record, the bit train indicating whether the process request received includes the attribute name, and
wherein the process group is searched for the second process in accordance with the bit train of each process request, the second process having a value of the bit train, indicating whether the attribute name included in the process request of the first process is included, different from a value of a bit train of the process request of the first process.

2. The distributed processing device according to claim 1, wherein the processor is configured to search the process group for a third process, the third process having as a process target a record having an attribute name different from the attribute name included in the process request as the execution target determined, and
determine the third process as the execution target when the search indicates a hit corresponding with the third process.

3. The distributed processing device according to claim 2, wherein the processor is configured to allocate the execution target determined to the plurality of nodes when the search does not indicate a hit corresponding with the third process.

4. The distributed processing device according to claim 1, wherein the process group is searched for the third process in accordance with each bit train of each process request, the third process having a value of the bit train, indicating whether the attribute name included in the process request of the execution target is included, different from the value of the bit train of the process request of the execution target.

5. A non-transitory computer readable storage medium that stores a distributed processing program causing a computer to perform a process, the process comprising:
searching, in accordance with attribute names identifying a plurality of records stored in a database, a process group for a second process having as a process target a record of an attribute name different from an attribute name included in a process request of a first process selected from among the process group to the database;
determining the first process and the second process as an execution target to be executed by a plurality of nodes when the searching indicates a hit corresponding with the second process;
allocating the determined execution target to the plurality of nodes that execute processes in parallel to the database;
receiving a process request of a process to the database; and
generating a bit train for each attribute name identifying each record, the bit train indicating whether the received process request includes the attribute name, and
wherein the searching includes searching the process group for the second process in accordance with the generated bit train of each process request, the second process having a value of the bit train, indicating whether the attribute name included in the process request of the first process is included, from a value of a bit train of the process request of the first process.

6. The non-transitory computer readable storage medium according to claim 5, wherein the searching includes searching the process group for a third process, the third process having as a process target a record having an attribute name different from the attribute name included in the process request as the determined execution target; and wherein the determining includes determining the third process as the execution target when the searching indicates a hit corresponding with the third process.

7. The non-transitory computer readable storage medium according to claim 6, wherein the allocating includes allocating the determined execution target to the plurality of nodes when the searching does not indicate a hit corresponding with the third process.

8. The non-transitory computer readable storage medium according to claim 5, wherein the searching includes searching the process group for the third process in accordance with the bit train of each process request, the third process having a value of the bit train, indicating whether the attribute name included in the process request of the execution target is included, different from the value of the bit train of the process request of the execution target.

9. A distributed processing method executed on processor, the processor executing a procedure comprising:
   searching, in accordance with attribute names identifying a plurality of records stored in a database, a process group for a second process having as a process target a record of an attribute name different from an attribute name included in a process request of a first process selected from among the process group to the database;
   determining the first process and the second process as an execution target to be executed by a plurality of nodes when the searching indicates a hit corresponding with the second process;
   allocating the determined execution target to the plurality of nodes that execute respective processes in parallel to the database;
   receiving a process request of a process to the database; and
   generating a bit train for each attribute name identifying each record, the bit train indicating whether the received process request includes the attribute name, and
   wherein the searching includes searching the process group for the second process in accordance with the generated bit train of each process request, the second process having a value of the bit train, indicating whether the attribute name included in the process request of the first process is included, from a value of a bit train of the process request of the first process.

10. The distributed processing method according to claim 9, wherein the searching includes searching the process group for a third process, the third process having as a process target a record having an attribute name different from the attribute name included in the process request as the determined execution target, and
    wherein the determining includes determining the third process as the execution target when the searching indicates a hit corresponding with the third process.

11. The distributed processing method according to claim 10, wherein the allocating includes allocating the determined execution target to the plurality of nodes when the searching does not indicate a hit corresponding with the third process.

12. The distributed processing method according to claim 9, wherein the searching includes searching the process group for the third process in accordance with bit train of each process request, the third process having a value of the bit train, indicating whether the attribute name included in the process request of the execution target is included, different from the value of the bit train of the process request of the execution target.

* * * * *